United States Patent
Lu et al.

(10) Patent No.: US 11,065,781 B2
(45) Date of Patent: *Jul. 20, 2021

(54) SYSTEM AND METHOD FOR FOUR-DIMENSIONAL PRINTING OF ELASTOMER-DERIVED CERAMIC STRUCTURES BY SELF-FORMING METHOD

(71) Applicant: City University of Hong Kong, Kowloon (HK)

(72) Inventors: Jian Lu, Kowloon (HK); Guo Liu, Kowloon (HK); Yan Zhao, Kowloon (HK)

(73) Assignee: City University of Hong Kong, Kowloon (HK)

( * ) Notice: Subject to any disclaimer, the term of this patent is extended or adjusted under 35 U.S.C. 154(b) by 199 days.

This patent is subject to a terminal disclaimer.

(21) Appl. No.: 16/006,924

(22) Filed: Jun. 13, 2018

(65) Prior Publication Data
US 2019/0381691 A1    Dec. 19, 2019

(51) Int. Cl.
| | |
|---|---|
| *B28B 1/00* | (2006.01) |
| *B33Y 10/00* | (2015.01) |
| *B28B 11/24* | (2006.01) |
| *B33Y 70/00* | (2020.01) |
| *B33Y 30/00* | (2015.01) |

(52) U.S. Cl.
CPC ............ *B28B 1/001* (2013.01); *B28B 11/243* (2013.01); *B33Y 10/00* (2014.12); *B33Y 30/00* (2014.12); *B33Y 70/00* (2014.12)

(58) Field of Classification Search
None
See application file for complete search history.

(56) References Cited

U.S. PATENT DOCUMENTS

| | | | | |
|---|---|---|---|---|
| 2016/0136877 A1* | 5/2016 | Rogers | ............... | B29C 61/0616 428/174 |
| 2017/0252974 A1* | 9/2017 | Ng | .......................... | B33Y 30/00 |
| 2018/0148379 A1* | 5/2018 | Schaedler | .............. | C09D 5/004 |

* cited by examiner

*Primary Examiner* — Matthew J Daniels
*Assistant Examiner* — Paul Spiel
(74) *Attorney, Agent, or Firm* — Renner Kenner Greive Bobak Taylor & Weber

(57) ABSTRACT

A system and method of constructing a 4D-printed ceramic object, the method including extruding inks including particles and polymeric patterns through a nozzle to deposit the inks to form a first elastic structure, subjecting the first elastic structure to tensile stress along at least one axis, extruding inks including particles and polymeric patterns through a nozzle to deposit the inks to form a second elastic structure provided to the first elastic structure under tensile stress, releasing the application of tensile stress from the first elastic structure to allow the first elastic structure and second elastic structure to form a 4D-printed elastomeric object, and converting the 4D-printed elastomeric object into the 4D-printed ceramic object.

14 Claims, 8 Drawing Sheets

SYSTEM AND METHOD FOR FOUR-DIMENSIONAL PRINTING OF ELASTOMER-DERIVED CERAMIC STRUCTURES BY SELF-FORMING METHOD

FIELD OF INVENTION

The present invention relates to the fabrication of ceramic structures. In particular, embodiments of the invention are directed to the printing of ceramic structures using elastomer-derived compounds. Particular embodiments of the ceramic structures are printed in a manner such that the shape of the structure is morphed by subjecting the structure to mechanical forces, temperature variation and chemical processing.

BACKGROUND

In the present specification, it will be understood that the term "self-shaping" refers to the process of forming a Three-Dimensional (3D) object by means of the object's inherent material properties.

In colloquial language, 4D printed objects (i.e. objects that are able to move or transform over time by virtue of their inherent construction and/or use of materials) are generally fabricated by a process known as Four-Dimensional (4D) printing. Thus, in the context of the present specification, it will be understood that any reference to a "4D printed object" is a reference to an object that has been printed using a 3D printing technology, but that is able to transform over time due to inherent properties of the object. Correspondingly, 4D printing refers to a printing process whereby a 3D printing mechanism or methodology is employed, and in some instances, followed by a shape-morphing step, in a manner such that a 4D-printed object is produced.

As will be appreciated, 4D-printed objects and 4D printing technology may find application in a number fields including robotics, life science applications, and biomimetic 4D printing.

Polymer-Derived Ceramics (PDCs) are a type of ceramic, which are prepared through thermolysis and chemical treatment of polymeric ceramic precursors. PDCs exhibit remarkable properties of conventional ceramics such as high thermal stability, chemical resistance to oxidation and corrosion, in addition to mechanical resistance to tribology. The microstructures and properties of PDCs can be tuned through tailored polymer systems and thermolysis conditions.

The additive manufacturing of ceramic precursors is a state-of-the-art technology used to construct complicated ceramic architectures. However, existing ceramic precursors are not flexible and sufficiently stretchable to enable self-shaping assembly prior to polymer-to-ceramic transformation.

It is against this background that the present invention has been developed.

SUMMARY OF THE INVENTION

In one aspect, the present invention is directed to a method of constructing a 4D-printed ceramic object, the method comprising the steps of: extruding inks including particles and polymeric ceramic precursors through a nozzle to deposit the inks to form a first elastic structure, subjecting the first elastic structure to tensile stress along at least one axis, extruding inks including particles and polymeric ceramic precursors through a nozzle to deposit the inks to form a second elastic structure provided to the first elastic structure under tensile stress, releasing the application of tensile stress from the first elastic structure to allow the first elastic structure and second elastic structure to form a 4D-printed elastomeric object, and converting the 4D-printed elastomeric object into the 4D-printed ceramic object.

In one embodiment, the second elastic structure includes at least one area of higher relative bending stiffness or uniform bending stiffness.

The release of the first elastic structure from the tensile stress further includes the generation of a relative compressive stress to the second elastic structure which deforms the second elastic structure.

In one embodiment, the at least one area of higher relative bending stiffness or uniform bending stiffness is arranged in a pattern.

In one embodiment, the first elastic structure is a planar substrate.

In one embodiment, the tensile stress is provided by attaching the first elastic structure to a stretching means.

The stretching means is a biaxial stretching device.

In one embodiment, the particles are zirconium dioxide nanoparticles.

In one embodiment, the polymeric ceramic precursors are Poly(DiMethylSiloxane).

In one embodiment, the inks are formed from a homogenous distribution of the particles in the polymeric ceramic precursors and wherein the weight percentage of the particles in the inks is in the range of from about 1% to about 90% and the weight percentage of the polymeric ceramic precursors in the inks is in the range of from about 10% to about 99%.

In one embodiment, the converting the 4D-printed elastomeric object into the 4D-printed ceramic object further includes subjecting the 4D-printed elastomeric object to pyrolysis in the presence of an inert gas.

In one embodiment, the inert gas is argon.

In one embodiment, the converting the 4D-printed elastomeric object into the 4D-printed ceramic object further includes subjecting the 4D-printed elastomeric object to pyrolysis whilst contained in a vacuum.

In one embodiment, the converting the 4D-printed elastomeric object into the 4D-printed ceramic object further includes subjecting the 4D-printed elastomeric object to further heat treatment in air after heat treatment in a vacuum or under an inert atmosphere.

In one aspect, the present invention is directed to a system of constructing a 4D-printed ceramic object, comprising: an extruding means which extrudes inks including particles and polymeric ceramic precursors through a nozzle to deposit the inks to form a first elastic structure, a stretching means subjects the first elastic structure to a tensile stress along at least one axis, the extruding means extrudes inks including particles and polymeric ceramic precursors through the nozzle to deposit the inks to form a second elastic structure provided to the first elastic structure, wherein, upon removing the first elastic structure from the stretching means, the first elastic structure and second elastic structure are allowed to form a 4D-printed elastomeric object which is converted into a the 4D-printed ceramic object.

BRIEF DESCRIPTION OF THE DRAWINGS

Notwithstanding any other forms which may fall within the scope of the present invention, a preferred embodiment will now be described, by way of example only, with reference to the accompanying drawings in which.

DETAILED DESCRIPTION OF PREFERRED EMBODIMENTS

Figure 1:
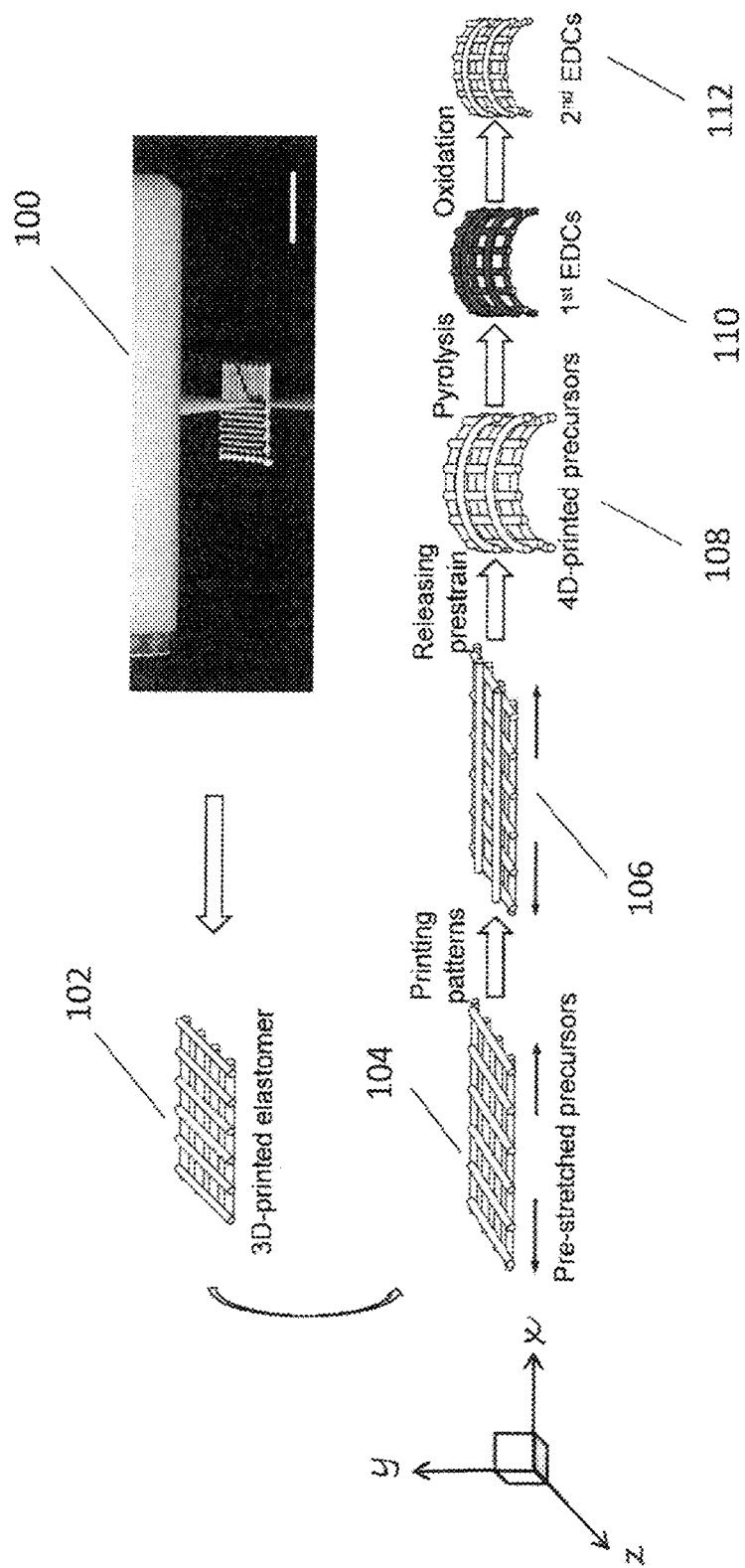
FIG. 1 illustrates the self-shaping assembly method accordance with an embodiment of the invention.

In the ensuing description, certain terms, once introduced, will be abbreviated for the sake of brevity and to improve readability. It will be understood that the use of such abbreviations should not be construed as being limiting or otherwise placing a "gloss" on the meanings of such terms beyond the meanings that would be placed on the terms when construed by a skilled addressee.

Broadly, one of the inventive aspects is directed to a method of constructing a 4D-printed ceramic object, the method comprising the following steps. Firstly, extruding inks including particles and polymeric ceramic precursors through a nozzle to deposit the inks to form a first elastic structure.

The first elastic structure is subjected to a tensile stress along at least one axis. A second elastic structure is formed by extruding inks including particles and ceramic precursors through a nozzle to deposit the inks. The inks are provided to the first elastic structure under tensile stress, after which the tensile stress applied to the first elastic structure is released to allow the first elastic structure and second elastic structure to form a 4D-printed elastomeric object. The 4D-printed elastomeric object is converted into the 4D-printed ceramic object.

In another aspect, the invention is directed to a system of constructing a 4D-printed ceramic object, comprising an extruding means which extrudes inks including particles and polymeric ceramic precursors through a nozzle to deposit the inks to form a first elastic structure, a stretching means subjects the first elastic structure to a tensile stress along at least one axis, the extruding means extrudes inks including particles and polymeric ceramic precursors through the nozzle to deposit the inks to form a second elastic structure provided to the first elastic structure, wherein, upon removing the first elastic structure from the stretching means, the first elastic structure and second elastic structure are allowed to form a 4D-printed elastomeric object which is converted into a the 4D-printed ceramic object.

Specific embodiments will now be described in more detail with reference to the drawings. In an embodiment, a known and cost efficient 4D printing method is used to form the 4D ceramic structure. One such method may include Direct Ink Writing (DIW) to form a first elastic structure and a second elastic structure from the ceramic precursor. However, other forms of additive manufacturing techniques, such as fused filament fabrication (FFF), Rapid Liquid Printing (RLP), Aerosol Jet, and Fluidic force microscopy (FluidFM) techniques may also be used to form the 4D ceramic structure as would be understood by the person skilled in the art.

Polydimethylsiloxane (PDMS) is a dominant elastomer in silicone systems and is useful as a ceramic precursor, while providing inherent flexibility to construct a material that is suitable for subjecting to tensile stress without the material experiencing plastic deformation. Furthermore, the stretchability of PDMS allows for the creation of complex structures. However, it will be understood that the polymeric ceramic precursors may also include polysiloxanes, polysilsesquioxanes, polycarbosiloxanes, polycarbosilanes, polysilylcarbodiimides, polysilsesquicarbodiimides, polysilazanes, polysilsesquiazanes or any combination of the above In an embodiment, the inks are formed from a homogenous distribution of the particles in the elastomeric ceramic precursor material. For example, the weight percentage of the particles in the inks is in the range of from about 1% to about 90% and the weight percentage of the polymeric ceramic precursors in the inks is in the range of from about 10% to about 99%.

In the example given with reference to the Figures, crystalline $ZrO_2$ (Zirconium dioxide) nanoparticles with a primary average size of 20-50 nm in diameter were incorporated into a PDMS matrix, forming a jammed network within the polymer matrix while serving as barriers to mass and heat transfer in the polymer matrix, to thereby eliminate shrinkage upon ceramization.

It will be understood that the nanoparticles may also include other variants, such as but not limited to, calcium oxide particles, aluminium oxide particles, titanium dioxide particles, indium oxide particles, zinc oxide particles, silicon dioxide particles, aluminium nitride particles, calcium silicate particles, silicon carbide particles, polymeric particles, metallic particles, carbon black particles, graphene particles, graphite particles, diamond particles, other refractory materials or any combination of the particles listed above. The particles, in the embodiment, are characterized by an average diameter of about 100 μm or less and may be uniformly or non-uniformly distributed powders or fibres or tubes or any other regular shapes or any other combination of the above.

Referring to FIG. 1, an embodiment includes a DIW apparatus 100 which is used to fabricate one or more 4D elastomeric structures. A first elastic structure may be in the form of an elastic substrate 102. The substrate may be in the form of a lattice of perpendicular strips of elastic ceramic precursor. Alternatively, the substrate may be formed in a honeycomb pattern of interconnecting polygons, or as a solid piece of elastic ceramic precursor material. Moreover, the elastic substrate 102 may be formed by the gradual accumulation or deposition of one or more layers of elastic ceramic precursor.

The substrate 102 is subjected to tensile pressure along at least one axis 104. In an embodiment, the substrate is subjected to tensile stress along the x-axis as shown in FIG. 1. This may be achieved by a stretching means, such as but not limited to a stretching device (not shown in the Figure). In more detail, the tensile stress along the x-axis may be provided by a uni-lateral stretching device. However, as would be understood by the person skilled in the art, a substrate may be subjected to tensile stress in any number of axes, and as such, the stretching device would be designed or modified in order to provide suitable tensile stress along those axes. For example, the stretching device may also include a bi-axial or multi-axial stretching device.

The DIW apparatus 100 may also be used to fabricate a second elastic structure provided to a face of the first elastic structure 106. The second elastic structure is printed or formed directly on to the first elastic structure, whilst the first elastic structure is subjected to tensile stress. The second elastic structure may be provided to one or more faces of the first elastic structure. The second structure may be printed in a pattern or other different shapes or arrangements. For example, the second structure is a pattern of two elongate parallel strips extending along face of the substrate along the x-axis.

Once the pattern has been printed onto the substrate, the tensile stress subjected to the substrate is released. Due to the elastomeric properties of the substrate, the substrate has not experienced plastic deformation, and accordingly, the elastic potential energy is released, and the substrate returns to its original dimensions. However, as the pattern is now joined to the substrate, the elastic potential energy is transferred or provided to the pattern. The pattern is subjected to compressive stress as the substrate returns to its original dimensions. As a result, the pattern deforms 108 which forms a 4D elastomeric object. As such, the 4D elastomeric object is "self-shaping" in accordance with the geometric constraints and physical properties of the object.

In accordance with the broader concept and the embodiments described and defined herein, the 4D elastomeric object may transformed into a 4D ceramic object. The elastomer-to-ceramic transformation may include the application of pyrolysis in inert atmosphere, oxidation in oxidative atmosphere or a combination of the techniques.

In an embodiment, the 4D elastomeric object is first subjected to pyrolysis in inert atmosphere to produce a first elastomer derived ceramic (EDC) object 110. The inert atmosphere may include argon gas or another inert gas. Alternatively, the 4D elastomeric object is subjected to heating in contained area containing a vacuum. Heating of the 4D elastomeric object may occur between 400° C. to 2000° C. The first EDC object 110 is then subjected to oxidation by heat treatment such as heating the first EDC object in 1000° C. or 1300° C. in an oxygen rich atmosphere e.g. in air to produce a second EDC object 112. The combination of both steps provides a relative increase in density when comparing the first EDC object 110 to the second EDC object 112. Furthermore, the combination of both techniques enables the resulting 4D ceramic object to be formed in different colours.

Figure 2:
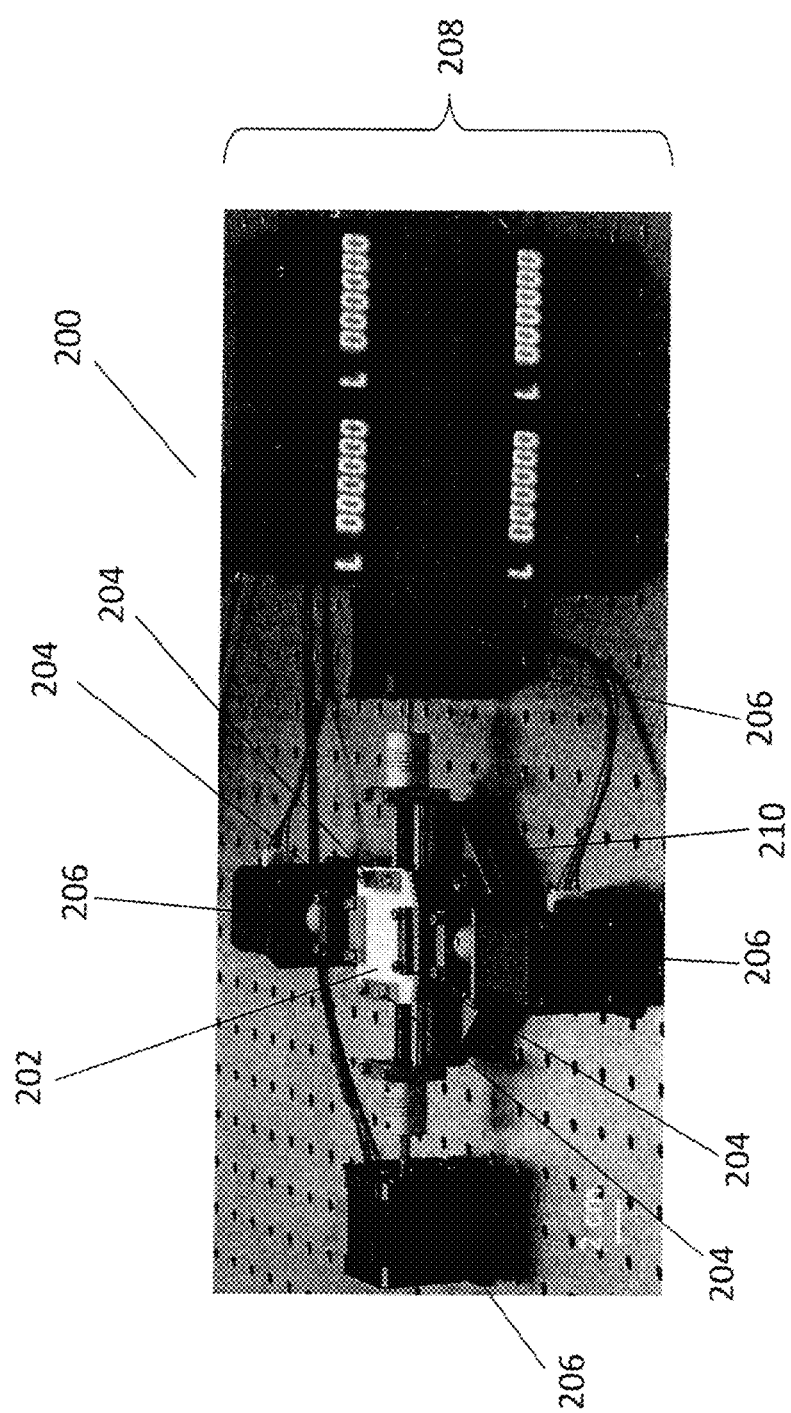
FIG. 2 illustrates a stretch device in accordance with an embodiment of the present invention.

Referring to FIG. 2, an example of a bi-axial stretching device 200 is provided. A square substrate 202 is provided, wherein each side of the substrate 202 is held by a clamping portion 204. Each clamping portion 204 is retracted in order to subject the substrate 202 to tensile stress, in this example the tensile stress is provided in both the x and y axes. The clamps may be retracted by a variety of different mechanisms. For example, the clamps may be in connection with two pairs of stepper motors 206 which provide a fine level of control over the tensile stress provided to the substrate 202. Furthermore, the stepper motors may be programmable. However, it would be understood by the person skilled in the art that other rotation rates may be used. Further, a control or displacement measuring means 208 may also be included in the stretching device 200. Moreover, a base 210 may also be provided to support the substrate whilst being subject to tensile stress.

Figure 3:
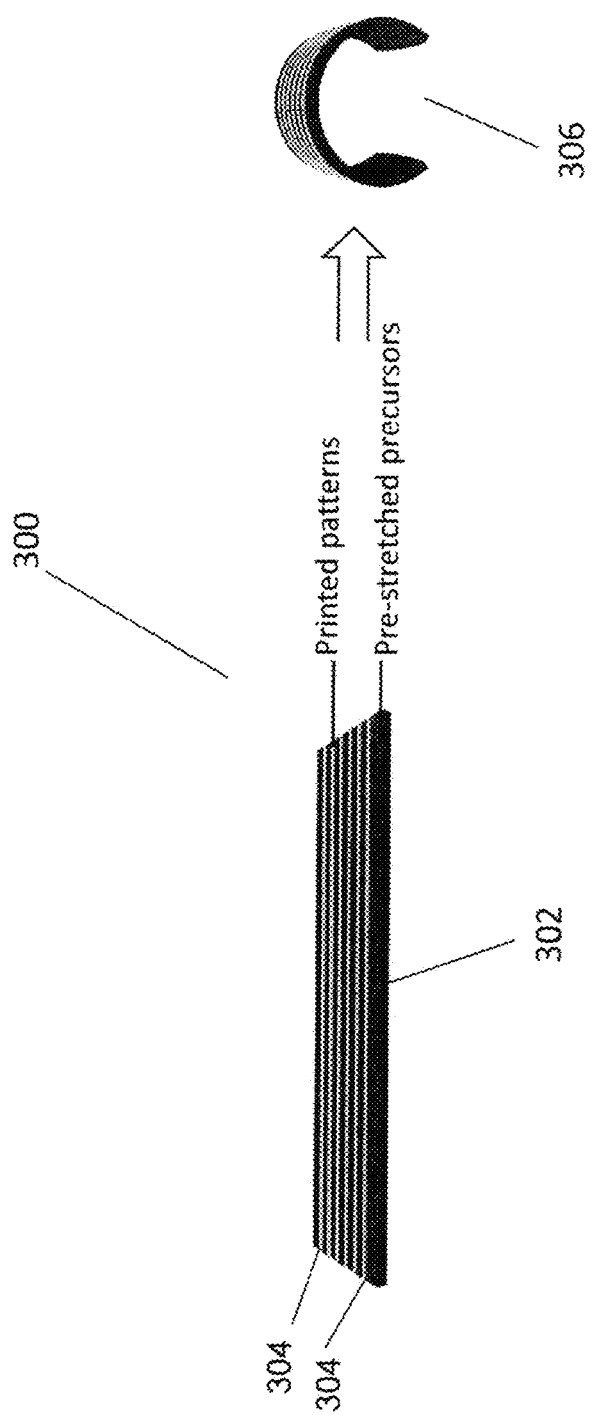
FIG. 3 illustrates a schematic of a bending configuration in accordance with an embodiment of the present invention.

In an embodiment, a self-forming bending configuration is provided in FIG. 3. The self-forming bending configuration 300 includes a substrate 302 which has been printed with an elastic ceramic precursor material. The substrate is filled with a square shape. The dimensions of the substrate may be 60 mm×10 mm×1 mm, with a center-to-center ligament spacing of 0.5 mm. The substrate is subjected to tensile stress to deform the substrate to 30% strain. A pattern is printed on the pre-stretched substrate 302 including one or more elongated cuboid strips 50 mm×9 mm×0.21 mm, with a center-to-center ligament spacing between the elongated cuboids of 1.2 mm. That is, the second elastic structure is applied only on one side of the first elastic structure.

In particular, the second elastic structure includes a pattern formed from a plurality of parallel elongated strips 304. The elongated cuboid strips extend along the substrate along the same axis that the tensile stress is applied.

The inks are extruded by means of a nozzle provided to the DIW apparatus (not shown), where the nozzle may be provided with a variety of different nozzle dimensions. For example, the nozzle diameter may be 260 μm. However, the dimensions, shapes, and patterns provided are merely provided to assist the reader to understand the workings of the invention. Accordingly, any suitable shape or pattern of suitable dimensions is within the purview of the person skilled in the art.

Once the pattern has been printed on the substrate, the tensile stress is released which allows the pattern and substrate deforms to form a self-shaping 4D elastomeric object. In more detail, the provision of the pattern to a first side of the substrate results in a second side of the substrate having a reduced bending stiffness compared to the first side of the substrate. Accordingly, when the substrate is released from the tensile stress, the substrate retracts and enacts a compressive force along the length of the pattern. The substrate and pattern buckle which results in the second side of the substrate forming a concave surface 306.

Figure 4B:
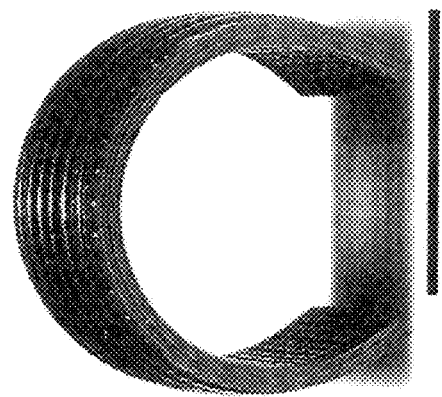
FIG. 4b illustrates a first elastomer-derived ceramic in a bending configuration with reference to scale bars of 1 cm in accordance with an embodiment of the present invention.
Figure 4A:
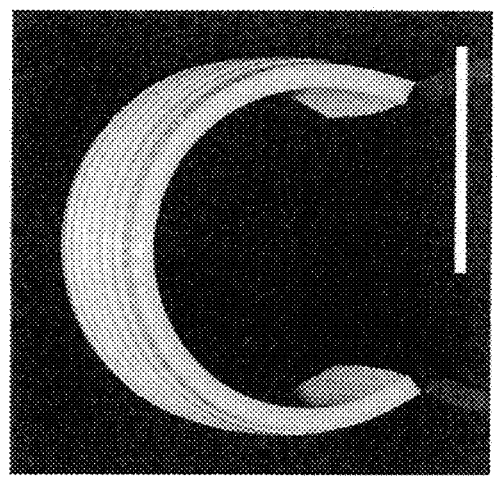
FIG. 4a illustrates an elastomer in a bending configuration with reference to scale bars of 1 cm in accordance with an embodiment of the present invention.

In an embodiment, once the self-shaping 4D elastomeric object shown in FIG. 4a has been formed, it is transformed via the pyrolysis process into a first EDC object shown in FIG. 4b. The second elastic precursor substrate formed by transforming the first EDC object via the oxidation process into a second EDC object. The inclusion of zirconium dioxide nanoparticles in the PDMS material improves the structural stability and reduces the shrinkage of the precursor material when undergoing ceramization.

Figure 5:
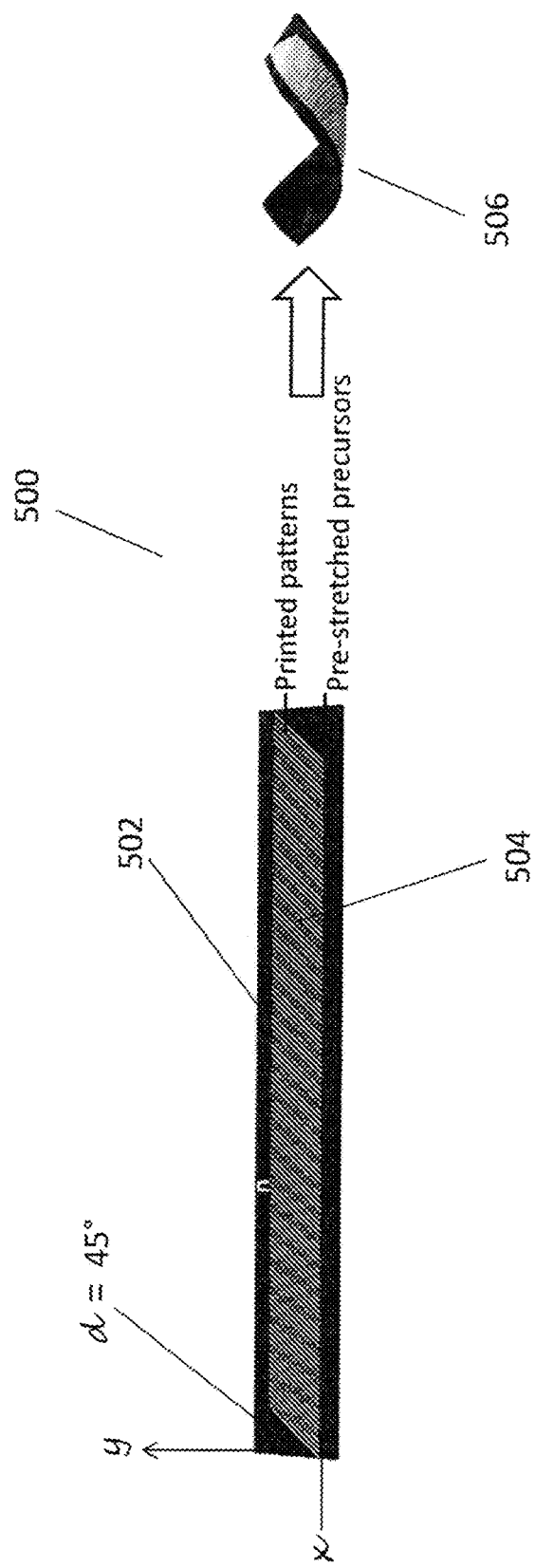
FIG. 5 illustrates schematic of a helical ribbon configuration in accordance with an embodiment of the present invention.

In an embodiment, a self-forming helical ribbon configuration is provided in FIG. 5. The self-forming bending configuration 500 includes a substrate 502 which has been printed with an elastic ceramic precursor material. The substrate 502 is arranged in an elongated rectangle shape. The dimensions of the rectangular shape of the substrate is 60 mm×10 mm×1 mm, with a center-to-center ligament spacing 0.5 mm. The substrate is subjected to tensile stress to deform the substrate to 120% strain. A pattern is printed on the pre-stretched substrate 502 including one or more elongated cuboid strips of 90 mm×6 mm×0.21 mm, and the center-to-center ligament spacing between the cuboids of 0.7 mm. Each elongated strip is arranged to intersect the sides of the rectangle along the y-axis at an angle of 45°. That is, the second elastic structure includes a pattern formed from a plurality of parallel elongated strips 504 arranged to extend along the substrate being offset 45° from the y axis. The elongated cuboid strips extend along the substrate along axis 45° offset from the axis along which the tensile stress is applied.

The inks are extruded by means of a nozzle provided to the DIW apparatus (not shown), where the nozzle may be provided with a variety of different nozzle dimensions. For example, the nozzle diameter may be 260 μm. However, the dimensions, shapes, offset angles, and patterns provided are merely provided to assist the reader to understand the workings of the invention. Accordingly, any suitable shape or pattern of suitable dimensions is within the purview of the person skilled in the art.

Once the pattern has been printed on the substrate, the tensile stress is released which allows the pattern and substrate deforms to form a self-shaping 4D elastomeric object. In more detail, the provision of the pattern to a first side of the substrate results in a second side of the substrate having a reduced bending stiffness compared to the first side of the substrate. Accordingly, when the substrate is released from the tensile stress, the substrate retracts and enacts a compressive force along the length of the pattern. The substrate and pattern buckle which results in the second side of the substrate forming a helical surface 506.

Figure 6B:
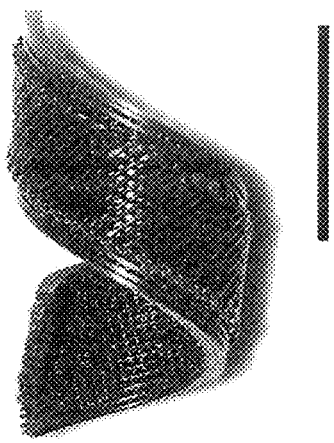
FIG. 6b illustrates a first elastomer-derived ceramic in a helical ribbon configuration with reference to scale bars of 1 cm in accordance with an embodiment of the present invention.
Figure 6A:
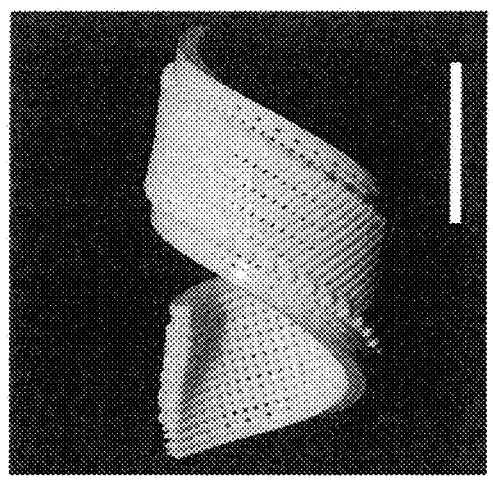
FIG. 6a illustrates an elastomer in a helical ribbon configuration with reference to scale bars of 1 cm in accordance with an embodiment of the present invention.

In an embodiment, once the self-shaping 4D elastomeric object shown in FIG. 6a has been formed, it is transformed via the pyrolysis process into a first EDC object shown in FIG. 6b.

The second elastic precursor substrate formed by transforming the first EDC object via the oxidation process into a second EDC object. The inclusion of zirconium dioxide nanoparticles in the PDMS improves the structural stability and reduces the shrinkage of the precursor material when undergoing ceramization.

Figure 7:
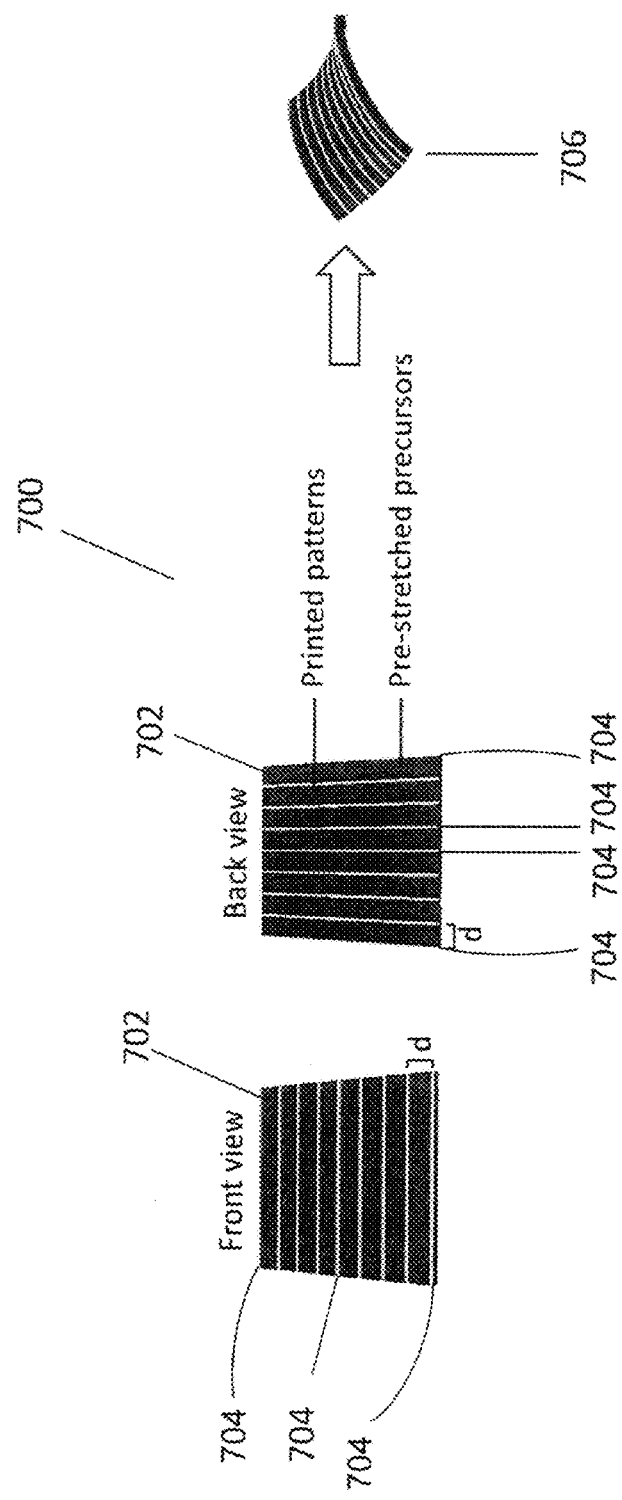
FIG. 7 illustrates schematic of a saddle surface configuration in accordance with an embodiment of the present invention.

In an embodiment, a self-forming hyperbolic paraboloid configuration is provided in FIG. 7. The self-forming bending configuration 700 includes a substrate 702 which has been printed with an elastic ceramic precursor material. The substrate 702 is arranged in a square shape. The dimensions of the square shape of the substrate may be 60 mm×60 mm×1 mm, with a center-to-center ligament spacing 0.5 mm. The substrate is subjected to tensile stress to deform the substrate to 20% strain. A pattern is printed on the pre-stretched substrate 702 including one or more elongated cuboid strips of 44 mm×44 mm×0.21 mm, and the center-to-center ligament spacing between the cuboids of 2.5 mm. That is, the second elastic structure is applied on both sides of the first elastic structure.

In particular, the second elastic structure includes two patterns, on two sides of the first elastic structure, formed from a plurality of parallel elongated strips 704 arranged to extend along the substrate length of the substrate perpendicular to the axis along which the tensile stress is applied. The angle between the two patterns on two sides of the first elastic structure is 90°.

The inks are extruded by means of a nozzle provided to the DIW apparatus (not shown), where the nozzle may be provided with a variety of different nozzle dimensions. For example, the nozzle diameter may be 260 μm. However, the dimensions, shapes, offset angles, and patterns provided are merely provided to assist the reader to understand the workings of the invention. Accordingly, any suitable shape or pattern of suitable dimensions is within the purview of the person skilled in the art.

Once the pattern has been printed on the substrate, the tensile stress is released which allows the pattern and substrate deforms to form a self-shaping 4D elastomeric object. In more detail, the provision of the pattern to a first side of the substrate results in a second side of the substrate having a reduced bending stiffness compared to the first side of the substrate. Accordingly, when the substrate is released from the tensile stress, the substrate retracts and enacts a compressive force along the length of the pattern. The substrate and pattern buckle which results in the second side of the substrate forming a saddle shape or hyperbolic paraboloid shape 706.

Figure 8A:
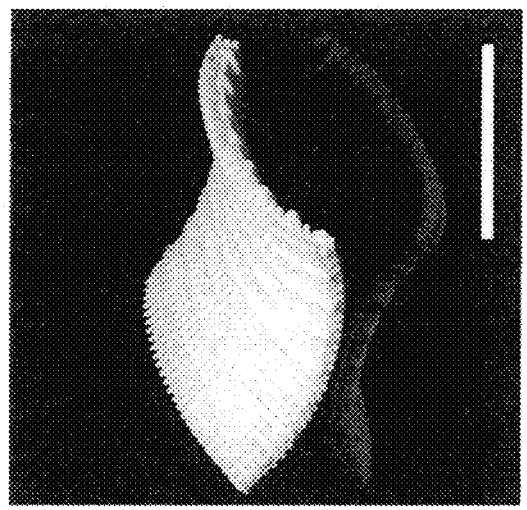
FIG. 8a illustrates an elastomer in a saddle surface configuration with reference to scale bars of 1 cm in accordance with an embodiment of the present invention.
Figure 8B:
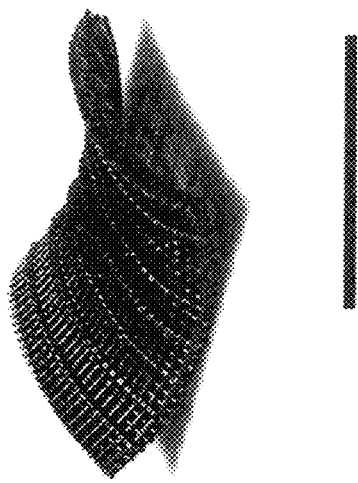
FIG. 8b illustrates a first elastomer-derived ceramic in a saddle surface configuration with reference to scale bars of 1 cm in accordance with an embodiment of the present invention.

In an embodiment, once the self-shaping 4D elastomeric object shown in FIG. 8a has been formed, it is transformed via the pyrolysis process into a first EDC object shown in FIG. 8b. The second elastic precursor substrate formed by transforming the first EDC object via the oxidation process into a second EDC object. The inclusion of zirconium dioxide nanoparticles in the PDMS improves the structural stability and reduces the shrinkage of the precursor material when undergoing ceramization.

ADVANTAGES AND INDUSTRIAL APPLICABILITY

The embodiments and broader invention described herein provide a number of advantages and have broad industrial applicability.

Firstly, the techniques and materials utilised and developed as part of the embodiments described herein provide for the creation of ceramic objects with programmable and customizable designs.

Secondly, advanced shape-morphing systems, inspired by compressive buckling-induced origami, enable the design of high-resolution complex ceramics are almost impossible to create by any other method due the complexity of the high-resolution complex ceramics.

Moreover, 4D printing of ceramics enable the design higher resolution than 3D printing. Variation of the self-forming method parameters provides high-fidelity in geometrical resolution involved in shape-morphing process, for example, displacement control in the stretch device.

A further advantage is that DIW-heat treatment method is a relatively cost effective compared to other additive manufacturing techniques for ceramics. Once driving factor for the cost effectiveness of the use of the DIW-heat treatment method is that it does not require the use of costly high energy apparatus that are required for other techniques. For example, 3D lithography techniques require an expensive laser or UV energy apparatuses other techniques involving the sintering of ceramic powders require an apparatus that fuses the powders at high temperatures at or above 1600° C. for ceramic powered compounds such as SiC and $Si_3N_4$.

Moreover, shape-morphing capabilities of elastomers improves the adaptability of structural materials to versatile application environments. For example, the embodiments of the present invention provide advantageous applications in space exploration as 3D-printed elastomeric precursors can be folded to save valuable space prior to launch, and then spread into desired structures at a later stage in the journey. After elastomer-to-ceramic transformation, 4D-printed ceramics provide thermal resistant and mechanically robust structures which is particularly useful for space craft on re-entry into an atmosphere.

Additionally, the method described demonstrates a strength-scalability synergy, meaning that the techniques and materials described herein are highly advantageous for application in production on an industrial scale.

Further, the techniques and materials utilised and developed as part of the embodiments are cost effective and enable the fabrication of 4D printed ceramic structures in a cost-efficient manner. For example, for a series of complex-shaped ceramics with similar geometries, the embodiments of the present invention provide a comparatively cost and time effective means of fabricating a series of complex-shaped ceramics with continuously variable geometries that are capable of being derived from a simple design.

Furthermore, all the materials and techniques used in the embodiments are based on commercially available and open-end feedstock systems, which enables the embodiments described herein to have commercial potential and industrial applicability without excessive initial capital expenditure on custom fabrication machinery.

Lastly, in a more general sense, the abovementioned advantages provide enable the materials and techniques of the embodiments to be utilized in many structural applications including autonomous morphing ceramic composites, aerospace propulsion components, and high temperature microelectromechanical systems.

The invention claimed is:

1. A method of constructing a 4D-printed ceramic object, the method comprising the steps of:
    extruding inks including particles and polymeric ceramic precursors through a nozzle to deposit the inks to form a first elastic structure,
    subjecting the first elastic structure to tensile stress along at least one axis,
    extruding inks including particles and polymeric ceramic precursors through a nozzle to deposit the inks to form a second elastic structure provided to the first elastic structure under tensile stress,
    releasing the application of tensile stress from the first elastic structure to allow the first elastic structure and second elastic structure to form a 4D-printed elastomeric object, and
    converting the 4D-printed elastomeric object into the 4D-printed ceramic object.

2. A method of constructing a 4D-printed ceramic object in accordance with claim 1, wherein the second elastic structure includes at least one area of higher relative bending stiffness or uniform bending stiffness.

3. A method of constructing a 4D-printed ceramic object in accordance with claim 2, wherein the release of the first elastic structure from the tensile stress further includes the generation of a relative compressive stress to the second elastic structure which deforms the second elastic structure.

4. A method of constructing a 4D-printed ceramic object in accordance with claim 2, wherein the at least one area of higher relative bending stiffness or uniform bending stiffness is arranged in a pattern.

5. A method of constructing a 4D-printed ceramic object in accordance with claim 1, wherein the first elastic structure is a planar substrate.

6. A method of constructing a 4D-printed ceramic object in accordance with claim 1, wherein the tensile stress is provided by attaching the first elastic structure to a stretching means.

7. A method of constructing a 4D-printed ceramic object in accordance with claim 6, wherein the stretching means is a biaxial stretching device.

8. A method of constructing a 4D-printed ceramic object in accordance with claim 1, wherein the particles are zirconium dioxide nanoparticles.

9. A method of constructing a 4D-printed ceramic object in accordance with claim 8, wherein the polymeric ceramic precursors are Poly(DiMethylSiloxane).

10. A method of constructing a 4D-printed ceramic object in accordance with claim 1, wherein the inks are formed from a homogenous distribution of the particles in the polymeric ceramic precursors and wherein the weight percentage of the particles in the inks is in the range of from about 1% to about 90% and the weight percentage of the polymeric ceramic precursors in the inks is in the range of from about 10% to about 99%.

11. A method of constructing a 4D-printed ceramic object in accordance with claim 1, wherein the step of converting the 4D-printed elastomeric object into the 4D-printed ceramic object further includes subjecting the 4D-printed elastomeric object to pyrolysis in the presence of an inert gas.

12. A method of constructing a 4D-printed ceramic object in accordance with claim 11, wherein the inert gas is argon.

13. A method of constructing a 4D-printed ceramic object in accordance with claim 1, wherein the converting the 4D-printed elastomeric object into the 4D-printed ceramic object further includes subjecting the 4D-printed elastomeric object to pyrolysis whilst contained in a vacuum.

14. A method of constructing a 4D-printed ceramic object in accordance with claim 1, wherein the converting the 4D-printed elastomeric object into the 4D-printed ceramic object further includes subjecting the 4D-printed elastomeric object to further heat treatment in air after heat treatment in a vacuum or under an inert atmosphere.

* * * * *